(12) United States Patent
Kawashiki (10) Patent No.: US 7,474,481 B2
(45) Date of Patent: Jan. 6, 2009

(54) OPTICAL PICKUP DEVICE

(75) Inventor: Mitsumasa Kawashiki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/904,325

(22) Filed: Sep. 26, 2007

(65) Prior Publication Data

US 2008/0080071 A1    Apr. 3, 2008

(30) Foreign Application Priority Data

Sep. 29, 2006    (JP)    .............................. 2006-267214

(51) Int. Cl.
*G02B 7/02*    (2006.01)
(52) U.S. Cl. .................. 359/811; 359/814; 359/824
(58) Field of Classification Search ......... 359/811–814, 359/819–824; 369/44.14, 44.15, 112.05, 369/112.25
See application file for complete search history.

(56) References Cited

U.S. PATENT DOCUMENTS 5,640,280 A * 6/1997 Lee .............................. 359/824
7,095,574 B2 * 8/2006 Koga et al. .................. 359/813
7,199,949 B2 * 4/2007 Haruguchi et al. .......... 359/814

FOREIGN PATENT DOCUMENTS

| JP | 2000-298855 | 10/2000 |
|---|---|---|
| JP | 2003-115121 | 4/2003 |

OTHER PUBLICATIONS

Patent Abstracts of Japan for Japanese Publication No. 2003-115121, Publication date Apr. 18, 2003 (1 page).
Patent Abstracts of Japan for Japanese Publication No. 2000-298855, Publication date Oct. 24, 2000 (2 pages).

* cited by examiner

*Primary Examiner*—Mohammed Hasan
(74) *Attorney, Agent, or Firm*—Osha • Liang LLP (57) ABSTRACT

An optical pickup device has an actuator, a lens tilt adjusting mechanism for adjusting a tilt of an objective lens by an extending and contracting operation of a piezoelectric element, a light detector for receiving a reflected light from an optical recording medium when an emitted light from a light source is collected on the optical recording medium by the objective lens and detecting electrical signals, and a control unit for controlling drive of the piezoelectric element based on the detection result of the light detector. The actuator has moveable part mounted on the objective lens, a fixed part for movably supporting the movable part, and a moving device for moving the objective lens with entire movable part in a tracking direction and a focusing direction.

6 Claims, 6 Drawing Sheets

OPTICAL PICKUP DEVICE

BACKGROUND OF THE INVENTION

1. Field of the Invention

The present invention relates to an optical pickup device equipped with a lens tilt adjusting mechanism for adjusting the tilt of an objective lens with respect to an optical recording medium.

2. Description of the Related Art

Some kinds of optical pickup device realize satisfactory reproduction performance and recording performance by collecting emitted light from a light source on an optical recording medium with an objective lens, adjusting the tilt of the objective lens with respect to the optical recording medium based on a result of detecting the reflected light from the optical recording medium, and maintaining an optical axis of the exit light from the objective lens perpendicular to the optical recording medium. The lens tilt adjusting mechanism arranged in such optical pickup device includes that which adjusts the tilt of the objective lens through extending and contracting operation of a piezoelectric element as disclosed in Japanese Unexamined Patent Publication No. 2003-115121 and Japanese Unexamined Patent Publication No. 2000-298855.

The lens tilt adjusting mechanism of Japanese Unexamined Patent Publication No. 2003-115121 is configured by a lens attachment part arranged in a cylindrical form in a lens holder, a plurality of piezoelectric elements arranged on a step surface on the inner side of the lens attachment part, and a rubber cap attached to the lens attachment part. The lens holder is a movable part of an actuator that magnetically moves the objective lens in a tracking direction and a focusing direction. The cap presses the objective lens arranged on the piezoelectric element from above (optical recording medium side) to maintain a state in which the piezoelectric element is sandwiched between the lens attachment part and the objective lens. With such configuration, the objective lens is tilted with respect to the optical recording medium and the lens holder by changing the applied voltage to each piezoelectric element and extending or contracting each piezoelectric element, thereby adjusting the tilt. A spherical surface and a spherical surface receiving part are arranged on the objective lens and the lens attachment part respectively at their contact position so that the objective lens rotates with the vicinity of a focus on the optical recording medium side as the center in time of tilt adjustment.

The lens tilt adjusting mechanism of Japanese Unexamined Patent Publication No. 2000-298855 is configured by a lens holder for holding an objective lens, a plate spring, an objective lens actuator base for supporting the lens holder by way of the plate spring, an objective lens actuator base holding part arranged on an optical head base, a spherical body and a coil spring freely fitted in a pass-through hole formed in the holding part, a blocking member for blocking the other side of the pass-through hole, and a plurality of piezoelectric elements for joining the objective lens actuator base and the optical head base. The spherical body is connected to the end of the objective lens actuator base inserted from the one side of the pass-through hole. The coil spring presses the spherical body towards the objective lens actuator base side in the pass-through hole. Thus, the objective lens actuator base holding part rotatably holds the objective lens actuator base so as to be rotatable in a direction of three-degree of freedom. With such configuration, the objective lens tilts together with the objective lens actuator base, the plate spring, and the lens holder with respect to the optical recording medium by changing the applied voltage to each piezoelectric element and extending or contracting each piezoelectric element, thereby adjusting the tilt.

SUMMARY OF THE INVENTION

However, in the lens tilt adjusting mechanism of Japanese Unexamined Patent Publication No. 2003-115121, since the objective lens is supported and held from the side, the side away from the optical recording medium, and the optical recording medium side by the lens attachment part, the piezoelectric element, and the cap arranged in the lens holder, a working distance between the objective lens and the optical recording medium is subjected to limitation due to interposition of the cap, and cannot be set very short. In order to respond to higher density recording and reproduction of the optical recording medium that is increasingly being demanded in recent years and will be in the future, miniaturization or increase in the density of pit cells of the optical recording medium, further reduction in the wavelength of the emitted light from the light source, and reduction in the working distance are required. That is, if the working distance cannot be set short, high density recording and reproduction of the optical recording medium is inhibited. In the lens tilt adjusting mechanism disclosed in Japanese Unexamined Patent Publication No. 2000-298855, the number of components is large, the configuration is complicating, and the manufacturing cost is high.

In view of the above problems, the present invention aims to provide an optical pickup device equipped with a lens tilt adjusting mechanism of simple configuration that adjusts the tilt of the objective lens with respect to the optical recording medium and that does not limit the working distance.

The present invention provides an optical pickup device comprising an actuator including a movable part mounted with an objective lens, a fixed part for movably supporting the movable part, and a moving means for moving the objective lens with the entire movable part in a tracking direction and a focusing direction; a lens tilt adjusting mechanism for adjusting a tilt of the objective lens by an extending and contracting operation of a piezoelectric element; a light detector for receiving a reflected light from an optical recording medium when an emitted light from a light source is collected on the optical recording medium by the objective lens and detecting electrical signals; and a control unit for controlling drive of the piezoelectric element based on the detection result of the light detector; wherein the lens tilt adjusting mechanism is configured by the piezoelectric element, a lens holder, and a holder fit-in part arranged in a tubular form in the movable part of the actuator; the objective lens is fixed to the lens holder; the lens holder is fitted to the inner side of the holder fit-in part, and held in the holder fit-in part in a tiltable manner when an outer peripheral surface of the lens holder contacts and slides along an inner peripheral surface of the holder fit-in part; the piezoelectric element is attached on the inner side of the holder fit-in part so that one end in an extending and contracting direction of the piezoelectric element contacts a step surface formed on a side away from the optical recording medium of the lens holder on the inner side of the holder fit-in part and the other end contacts the surface on the side away from the optical recording medium of the lens holder; and other members are not interposed between the objective lens and the optical recording medium.

According to such configuration, in the lens tilt adjusting mechanism, the lens holder fixed with the objective lens is held in a tiltable manner in the holder fit-in part arranged in the movable part of the actuator, and the piezoelectric element is arranged so as to contact the surface of the side away from the optical recording medium of the lens holder. The piezoelectric element extends or contracts by changing the applied voltage based on the detection result of the light detecting means of when the emitted light from the light source is collected on the optical recording medium by the objective lens, and the reflected light from the optical recording medium is received at the light detecting means, whereby the lens holder tilts with respect to the optical recording medium as well as the movable part and the fixed part of the actuator, thereby adjusting the tilt of the objective lens with respect to the optical recording medium. Therefore, even if the optical recording medium is tilted in reproduction and recordation of the information with respect to the optical recording medium, satisfactory reproduction performance and recording performance can be achieved by maintaining the optical axis of the exit light from the objective lens always perpendicular to the optical recording medium through tilt adjustment of the objective lens. Furthermore, since no other member is interposed between the objective lens and the optical recording medium, the working distance between the objective lens and the optical recording medium can be freely set short without limitation, and it is possible to respond advantageously to higher density recording and reproduction of the optical recording medium that has been demanded in recent years and will be in the future. Moreover, since the lens tilt adjusting mechanism is configured by the piezoelectric element, the lens holder, and the holder fit-in part arranged on the movable part of the actuator, the number of components is few, the configuration is simple, and the manufacturing cost can be suppressed low.

According to one embodiment of the present invention, in the aforementioned optical pickup device, a plurality of piezoelectric elements is arranged at equiangular interval on the inner side of the holder fit-in part.

In this manner, the lens holder is tilted at good balance in multi-directions by changing the applied voltage to each piezoelectric element to extend or contract each piezoelectric element, and the tilt of the objective lens with respect to the optical recording medium is appropriately adjusted.

According to one embodiment of the present invention, in the aforementioned optical pickup device, the piezoelectric element is extended to a predetermined length longer than in shortest state and shorter than in longest state by applying offset voltage in an initial state.

In this manner, the piezoelectric element can be easily and freely extended and contracted at rapid response speed by raising and lowering the application voltage from the initial state without inverting the polarity of the applied voltage to the piezoelectric element, and thus the configuration of a circuit for applying the voltage to the piezoelectric element can be simplified.

According to one embodiment of the present invention, in the aforementioned optical pickup device, the lens holder is formed into a ring shape; the objective lens is fixed on an inner side of the lens holder such that a main point of the objective lens coincides with a center axis of the lens holder; the lens holder is held in the holder fit-in part so that the center axis of the lens holder coincides with the center axis of the holder-fit in part and an optical axis of the light passing through the holder fit-in part; the holder fit-in part is formed into a cylindrical form; and an inner peripheral surface of the holder-fit in part is formed into a curved surface in the axial direction so as to adapt with a trajectory of the outer peripheral surface of the lens holder when the lens holder rotates with the main point of the objective lens as the center on the inner side of the holder fit-in part.

In this manner, since the lens holder rotates with the main point of the objective lens as the center when adjusting the tilt of the objective lens with the entire lens holder through the extending and contracting operation of the piezoelectric element, the main point of the objective lens is reliably prevented from shifting from the optical axis of the light passing through the holder fit-in part, and the optical performance of the objective lens is always sufficiently exerted. The lens holder can be smoothly and slidably moved along the inner peripheral surface of curved surface of the holder fit-in part, and the tilt of the objective lens with respect to the optical recording medium can be microscopically adjusted at high precision.

According to one embodiment of the present invention, in the aforementioned optical pickup device, a projection is arranged at an end on the optical recording medium side of the inner peripheral surface of the holder fit-in part.

Although the lens holder may be prevented from slipping out from the holder fit-in part by exactly fitting the outer diameter of the lens holder and the inner diameter of the holder fit-in part, the lens holder is reliably prevented from slipping out from the holder fit-in part by arranging the projection at the end on the optical recording medium side of the inner peripheral surface of the holder fit-in part.

According to a typical embodiment of the present invention, an optical pickup device comprising an actuator including a movable part mounted with an objective lens, a fixed part for movably supporting the movable part, and a coil and a magnet for moving the objective lens with the entire movable part in a tracking direction and a focusing direction; a lens tilt adjusting mechanism for adjusting a tilt of the objective lens by an extending and contracting operation of a piezoelectric element; a light detector for receiving a reflected light from an optical recording medium when an emitted light from a light source is collected on the optical recording medium by the objective lens and detecting electrical signals; and a control unit for controlling drive of the piezoelectric element based on the detection result of the light detector. The lens tilt adjusting mechanism is configured by the piezoelectric element, a lens holder formed into a ring shape, and a holder fit-in part arranged in a cylindrical form in the movable part of the actuator. The objective lens is fixed on an inner side of the lens holder such that a main point of the objective lens coincides with a center axis of the lens holder. An outer peripheral surface of the lens holder is formed into a curved surface in an axial direction. An inner peripheral surface of the holder-fit in part is formed into a curved surface in the axial direction so as to adapt with a trajectory of the outer peripheral surface of the lens holder when the lens holder rotates with the main point of the objective lens as the center on the inner side of the holder fit-in part, a projection being arranged at an end on the optical recording medium side of the inner peripheral surface. The lens holder is fitted to the inner side of the holder fit-in part, and held in the holder fit-in part so that the center axis of the lens holder coincides with the center axis of the holder-fit in part and an optical axis of the light passing through the holder fit-in part, and the lens holder can tilt when the outer peripheral surface of the lens holder contacts and slides along the inner peripheral surface of the holder fit-in part. Three piezoelectric elements are attached at an equiangular interval on the inner side of the holder fit-in part so that one end in an extending and contracting direction of the piezoelectric element contacts a step surface formed on a side away from the optical recording medium of the lens holder on the inner side of the holder fit-in part and the other end contacts the surface on the side away from the optical recording medium of the lens holder, and are extended to a predetermined length longer than in shortest state and shorter than in longest state by applying offset voltage in an initial state. Other members are not interposed between the objective lens and the optical recording medium.

Each piezoelectric element is easily and freely extended and contracted at rapid response speed by raising or lowering the applied voltage to each three piezoelectric element of the lens tilt adjusting mechanism based on the detection result of the light detecting means receiving the reflected light from the optical recording medium, whereby the lens holder is reliably tilted at good balance in multi-directions such as tangential tilt direction and radial tilt direction in three axes, thereby appropriately adjusting the tilt of the objective lens with respect to the optical recording medium. In adjustment, the lens holder rotates with the main point of the objective lens as the center, and thus the main point of the objective lens is reliably prevented from shifting from the optical axis of the light passing through the holder fit-in part, and the optical performance of the objective lens is always sufficiently exerted. The lens holder is smoothly and slidably moved along the inner peripheral surface of curved surface of the holder fit-in part, and the tilt of the objective lens with respect to the optical recording medium can be microscopically adjusted at high precision. Furthermore, the lens holder is reliably prevented from slipping out from the holder fit-in part with the projection arranged at the end on the optical recording medium side on the inner peripheral surface of the holder fit-in part. Therefore, even if the optical recording medium is tilted in reproduction and recordation of information with respect to the optical recording medium, satisfactory reproduction performance and recording performance are achieved by constantly maintaining the optical axis of the emitted light from the objective lens perpendicular to the optical recording medium by the tilt adjustment of the objective lens. Furthermore, since no other member is interposed between the objective lens and the optical recording medium, the working distance between the objective lens and the optical recording medium can be freely set short without limitation, and it is possible to respond advantageously to higher density recording and reproduction of the optical recording medium that has been demanded in recent years and will be in the future. Moreover, since the lens tilt adjusting mechanism is configured by the piezoelectric element, the lens holder, and the holder fit-in part arranged on the movable part of the actuator, the number of components is few, the configuration is simple, and the manufacturing cost can be suppressed low. Additionally, the tilt adjustment in multi-directions of the objective lens becomes possible by using three piezoelectric elements without inverting the polarity of the applied voltage to each piezoelectric element, and the configuration of the circuit for applying voltage to the piezoelectric element is simplified and the cost for the piezoelectric element and the circuit an be suppressed low.

According to the present invention, the configuration is simple since the lens tilt adjusting mechanism is configured by the piezoelectric element, the lens holder and the holder fit-in part arranged on the movable part of the actuator. The tilt of the objective lens with respect to the optical recording medium can be adjusted by extending or contracting the piezoelectric element based on the detection result of the light detecting means that has received the reflected light from the optical recording medium. The working distance between the objective lens and the optical recording medium can be freely set short without limitations since no other member is interposed between the objective lens and the optical recording medium.

DESCRIPTION OF THE PREFERRED EMBODIMENT

Figure 1:
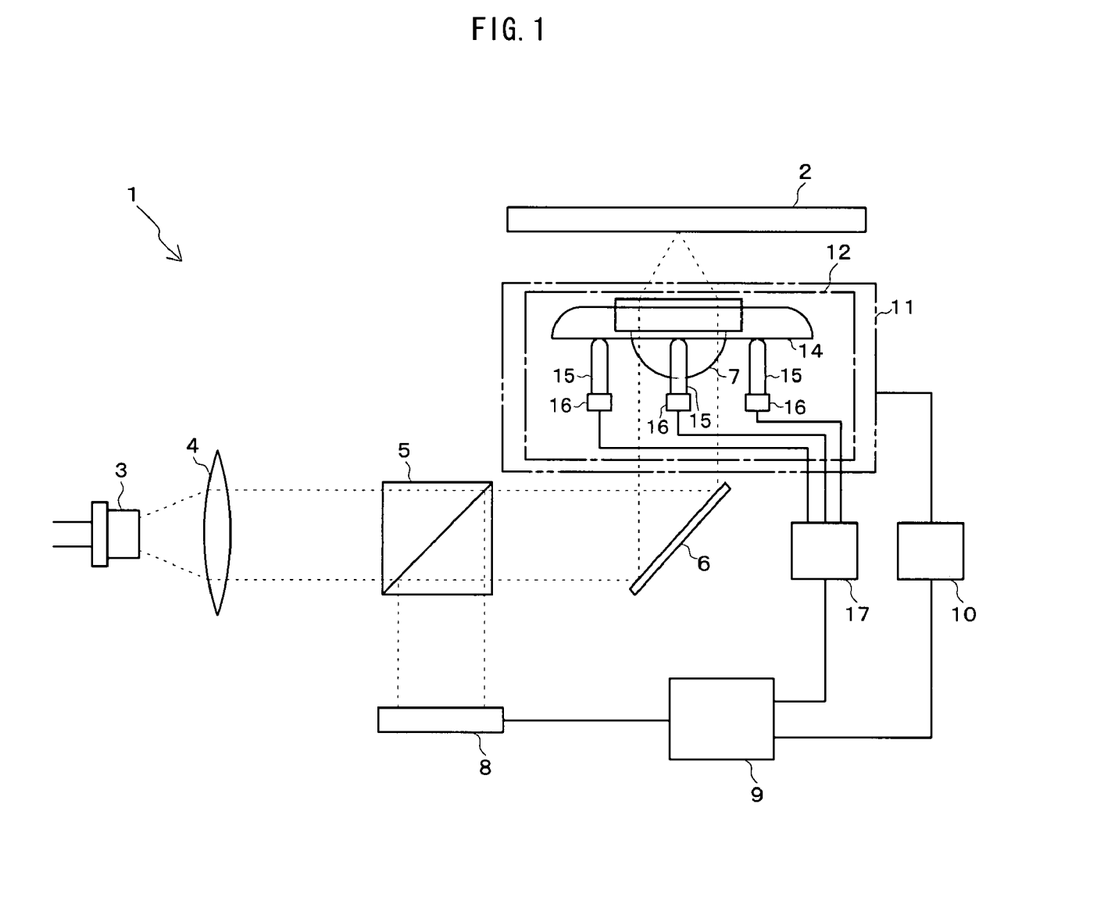
FIG. 1 is a configuration view of an optical pickup device according to an embodiment of the present invention.

FIG. 1 is a view showing a configuration of an optical pickup device 1 according to an embodiment of the present invention. In FIG. 1, the optical pickup device 1 is mounted on a disc player, a disc recorder, and the like to perform reproduction or recordation of information with respect to an optical recording medium 2 such as DVD (Digital Versatile Disc) or blu-ray disc (registered trademark) and the like. A light source 3 of the optical pickup device 1 is a semiconductor laser element that emits a laser light having a wavelength corresponding to the optical recording medium 2. The laser light emitted from the light source 3 is converted to parallel light flux by a collimator lens 4, and transmits through a prism 5. An advancing direction of the laser light is bent upward by an up mirror 6, and then the light enters into an objective lens 7. The objective lens 7 collects the laser light entered from the up mirror 6, and irradiates the laser light on the optical recording medium 2. The light reflected by the optical recording medium 2 transmits through the objective lens 7. The advancing direction of the light is bent by the up mirror 6 and the prism 5 respectively, and the reflected light is received at a light detector 8. The light detector 8 converts the light received by a light receiving unit (e.g. divided into four) to an electrical signal, detects reproduction signal, tracking error signal, focusing error signal, and a signal indicating received light amount, and outputs the signals to a control unit 9.

The control unit 9 controls the drive of an actuator 11 mounted with the objective lens 7 by an actuator driving circuit 10 based on the tracking error signal detected by the light detector 8, and performs a tracking servo to microscopically movement adjust the objective lens 7 in a tracking direction parallel to the optical recording medium 2. The control unit 9 also controls the drive of the actuator 11 by the actuator driving circuit 10 based on the focusing error signal detected by the light detector 8, and performs a focusing servo to microscopically movement adjust the objective lens 7 in a focusing direction perpendicular to the optical recording medium 2. A lens tilt adjusting mechanism 12 for adjusting the tilt of the objective lens 7 with respect to the optical recording medium 2 is arranged on the actuator 11. The lens tilt adjusting mechanism 12 includes three piezoelectric elements 15 and a lens holder 14 fixed with the objective lens 7. The control unit 9 changes the applied voltage on an electrode 16 of each piezoelectric element 15 by a voltage applying circuit 17 based on the received light amount signal detected in the light detector 8 or the tilted amount of the optical recording medium 2 and the objective lens 7 calculated from the relevant signal to control the drive of each piezoelectric element 15, and tilts the lens holder 14 through extending and contracting operation of each piezoelectric element 15 to adjust the tilt of the objective lens 7 with respect to the optical recording medium 2.

Figure 2:
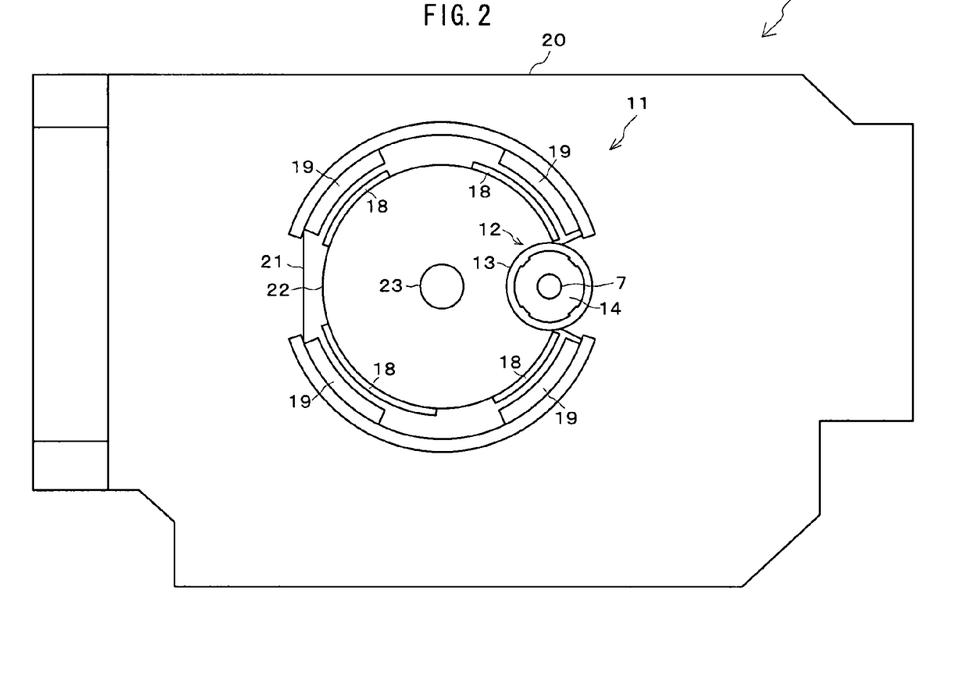
FIG. 2 is a view showing an application example of when the optical pickup device is an axis rotation slidably moving type.

FIG. 2 is a view showing an application example of when the optical pickup device 1 is an axis rotation slidably moving type. In FIG. 2, a base 20 of the optical pickup device 1 is fixed to a chassis of a disc player and the like. The light source 3, the collimator lens 4, the prism 5, the up mirror 26, and the light detector 8 shown in FIG. 1 are arranged inside the base 20. The actuator 11, the control unit 9, the actuator drive circuit 10, and the voltage applying circuit 17 described above are arranged on the base 20. In FIG. 2, only the actuator 11 is illustrated. A shaft 23 is passed through and fixed at the middle of a fixed part 21 of the actuator 11. The fixed part 21 and the shaft 23 are fixed at a predetermined tilt with respect to an upper surface of the base 20. A movable part 22 of the actuator 11 is arranged above the middle of the fixed part 21. The movable part 22 has the shaft 23 passed through at the middle and is rotatably supported by the fixed part 21 by way of the shaft 23. An electromagnetic coil 18 and a magnet 19 are fixed at the opposing side surfaces of the movable part 22 and the fixed part 21. A holder fit-in part 13 is formed in a cylindrical form and arranged on one side of the movable part 22. The holder fit-in part 13 is included in the lens tilt adjusting mechanism 12 described above. The lens holder 14 is fitted to the inner side of the holder fit-in part 13. The laser light which advancing direction is bent upward by the up mirror 6 passes through the inner side of the holder fit-in part 13 and enters the objective lens 7 fixed on the lens holder 14. The lens holder 14 and the objective lens 7 are rotated with the entire movable part 22 with the shaft 23 as the center by the magnetic field of the electromagnetic coil 18 and the magnet 19 of the actuator 11, and microscopic movement adjustment is performed in the tracking direction and the focusing direction.

Figure 3:
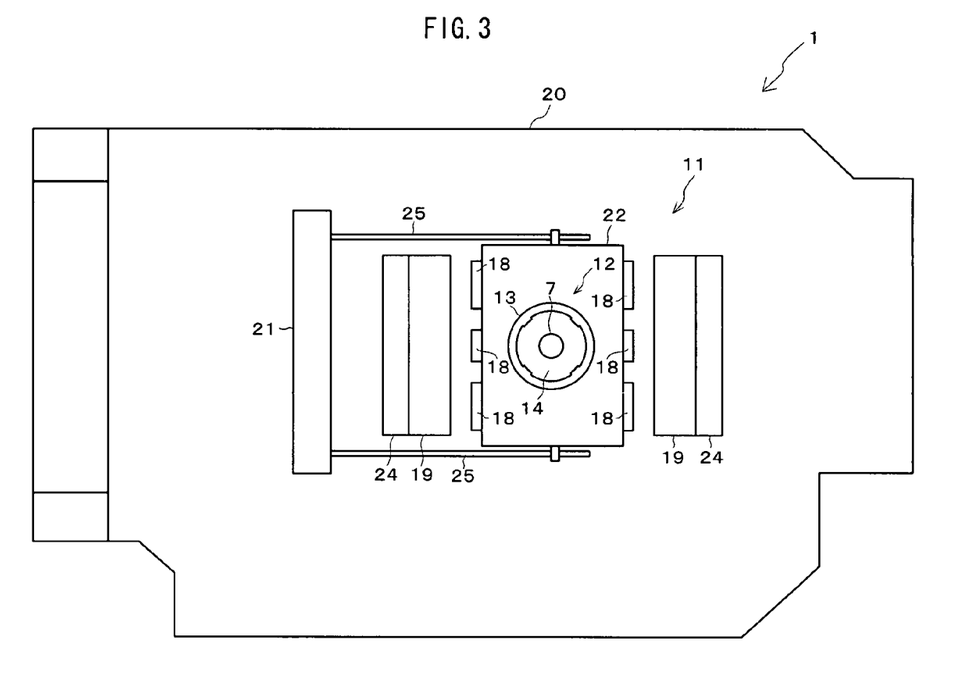
FIG. 3 is a view showing an application example of when the optical pickup device is a wire suspension type.

FIG. 3 is a view showing an application example of when the optical pickup device 1 is a wire suspension type. In the figure, same reference characters are denoted for portions the same as or corresponding to the portions in FIG. 2 for convenience. In FIG. 3, the fixed part 21 and a yoke 24 of the actuator 11 are fixed on the base 20 of the optical pickup device 1. The fixed part 21 movably supports the movable part 22 of the actuator 11 by way of a wire 25. The electromagnetic coil 18 and the magnet 19 are fixed on the opposing side surfaces of the movable part 22 and the yoke 24. The holder fit-in part 13 is formed in a cylindrical form and arranged at the middle of the movable part 22. The lens holder 14 is fitted to the inner side of the holder fit-in part 13. Movement of the lens holder 14 and the objective lens 7 are microscopically adjusted with the entire movable part 22 in the tracking direction and the focusing direction by the magnetic field of the electromagnetic coil 18 and the magnet 19 of the actuator 11.

Figure 4:
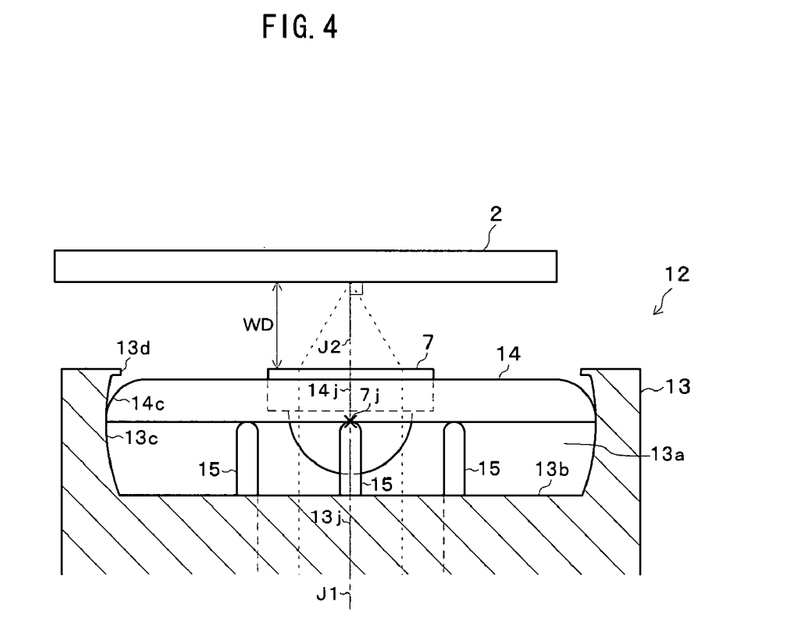
FIG. 4 is a view showing a lens tilt adjusting mechanism arranged in the optical pickup device.
Figure 5:
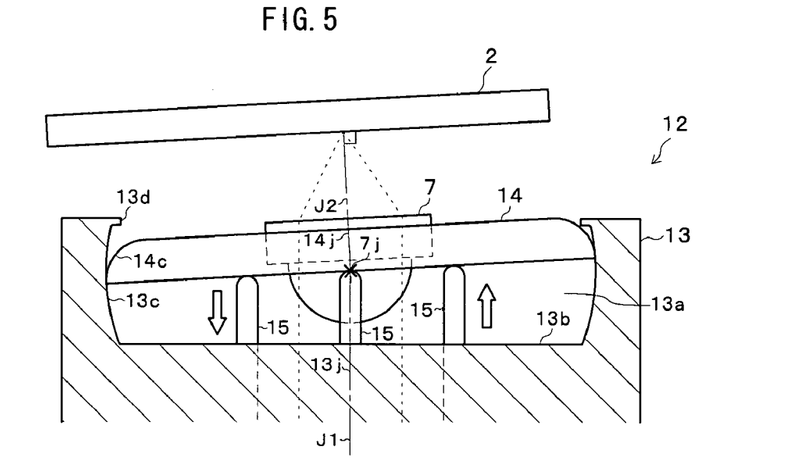
FIG. 5 is a view showing the lens tilt adjusting mechanism arranged in the optical pickup device.

FIGS. 4 and 5 are views showing the lens tilt adjusting mechanism 12. The lens tilt adjusting mechanism 12 is configured by the holder fit-in part 13, the lens holder 14, and three piezoelectric elements 15. The lens holder 14 is fitted to a hollow portion 13a formed on the upper part of the inner side of the holder fit-in part 13. The lens holder 14 is formed into a ring shape. The objective lens 7 is fixed on the inner side of the lens holder 14 with adhesive etc. such that the center axis 14j of the lens holder 14 and the main point 7j of the objective lens 7 coincide. A step surface 13b is formed below (side away from the optical recording medium 2) the lens holder 14 at the hollow portion 13a of the holder fit-in part 13.

Figure 6:
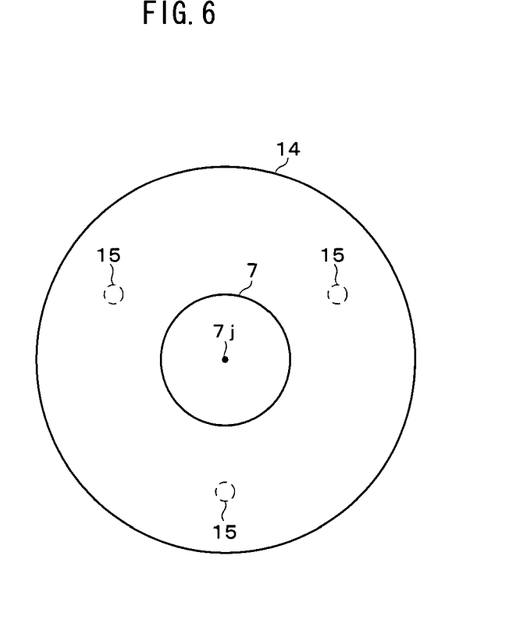
FIG. 6 is an arrangement view of a piezoelectric element arranged in the optical pickup device.

Each piezoelectric element 15 is attached on the inner side of the holder fit-in part 13 so that one end in the extending and contracting direction of the piezoelectric element 15 contacts the step surface 13b and the other end contacts the lower surface (surface on the side away from the optical recording medium 2) of the lens holder 14. Such other end of each piezoelectric element 15 is formed to a sphere so as to make a point contact with the lens holder 14. Each piezoelectric element 15 is arranged at equiangular (120°) interval at the peripheral of the objective lens 7 when seen from above (optical recording medium 2 side) as shown in FIG. 6. In the initial state, each piezoelectric element 15 is applied with the offset voltage by the voltage applying circuit 17 and extended to a predetermined length longer than the shortest state and shorter than the longest state. Thus, each piezoelectric element 15 extends and contracts at a rapid response speed by raising and lowering the applied voltage to each piezoelectric element 15 by the voltage applying circuit 17.

The outer diameter of the lens holder 14 and the diameter of the hollow portion 13a of the holder fit-in part 13 exactly fit with respect to each other. The outer peripheral surface 14c of the lens holder 14 contacts and slides on the inner peripheral surface 13c of the hollow portion 13a of the holder fit-in part 13, whereby the lens holder 14 is held in a tiltable manner in the holder fit-in part 13. In the state shown in FIG. 4, the lens holder 14 is perpendicular to the center axis 13j of the holder fit-in part 13 and held by the holder fit-in part 13 so that the center axis 14j of the lens holder 14 coincides with the center axis 13j of the holder fit-in part 13 and an optical axis J1 of the light passing through the holder fit-in part 13. No other members are interposed between the objective lens 7 and the optical recording medium 2 by holding the lens holder 14 in the holder fit-in part 13.

The outer peripheral surface 14c of the lens holder 14 is formed to a curved surface in the axial direction such that the diameter reduces towards the upper side. The inner peripheral surface 13c of the holder fit-in part 13 is formed to a curved surface in the axial direction so as to adapt a trajectory of the distal end of the outer peripheral surface 14c when the lens holder 14 rotates with the main point 7j of the objective lens 7 as the center in the hollow portion 13a. A projection 13d is formed projecting towards the inner side at the upper end (end on the optical recording medium 2 side) of the inner peripheral surface 13c of the holder fit-in part 13. The projection 13d may be arranged across the entire periphery of the upper end of the inner peripheral surface 13c or may be locally arranged in plurals at the upper end of the inner peripheral surface 13c. The lens holder 14 and the holder fit-in part 13 are made of synthetic resin and have flexibility. When the lens holder 14 is pushed against the hollow portion 13a of the holder fit-in part 13, the side wall of the holder fit-in part 13 and the lens holder 14 deflect so that the lens holder 14 is fitted into the hollow portion 13a.

According to the lens tilt adjusting mechanism 12 described above, the control unit 9 changes the applied voltage to each piezoelectric element 15 by the voltage applying circuit 17 to extend or contract each piezoelectric element 15 based on the detection result (received light amount and amount of tilt of optical recording medium 2 and objective lens 7) in the light detector 8 when the emitted light from the light source 3 is collected at the optical recording medium 2 by the objective lens 7 and the reflected light from the optical recording medium 2 is received by the light detector 8, whereby the lens holder 14 tilts with respect to the optical recording medium 2, the fixed part 21 and the movable part 22 of the actuator 11, and the holder fit-in part 13, and the tilt of the objective lens 7 with respect to the optical recording medium 2 can be adjusted.

Each piezoelectric element 15 is extended and contracted by changing the applied voltage to each three piezoelectric element 15 when adjusting the tilt of objective lens 7, whereby the lens holder 14 is reliably tilted at good balance in multi-directions such as tangential tilt direction and radial tilt direction in three axes, and the tilt of the objective lens 7 with respect to the optical recording medium 2 can be appropriately adjusted.

In the initial state, if the offset voltage is applied to each piezoelectric element 15 to extend each piezoelectric element 15 to a predetermined length longer than the shortest state and shorter than the longest state, each piezoelectric element 15 can be easily and freely extended and contracted at rapid response speed by raising or lowering the applied voltage from the initial state without inverting the polarity of the applied voltage to the piezoelectric element 15, and thus the configuration of the voltage applying circuit 17 can be simplified.

Since the lens holder 14 rotates with the main point 7j of the objective lens 7 as the center along the inner peripheral surface 13c of curved surface of the holder fit-in part 13 in the tilt adjustment of the objective lens 7, the main point 7j of the objective lens 7 is reliably prevented from shifting from the optical axis J1 of the light passing through the holder fit-in part 13, and the optical performance of the objective lens 7 is always sufficiently exerted.

In tilt adjustment of the objective lens 7, the lens holder 14 is smoothly tilted at the sphere shaped end of the piezoelectric element 15, the outer peripheral surface 14c of curved surface of the lens holder 14 and the inner peripheral surface 13c of curved surface of the holder fit-in part 13 are smoothly rubbed against each other, and the tilt of the objective lens 7 with respect to the optical recording medium 2 is microscopically adjusted at high precision.

The lens holder 14 is prevented from slipping out from the hollow portion 13a by exactly fitting the outer diameter of the lens holder 14 and the diameter of the hollow portion 13a of the holder fit-in part 13. In addition, by arranging the projection 13d at the end on the optical recording medium 2 side of the inner peripheral surface 13c of the holder fit-in part 13, the lens holder 14 is reliably prevented from slipping out from the hollow portion 13a.

Therefore, even if the optical recording medium 2 is tilted, for example, as shown in FIG. 5 in reproduction and recordation of information with respect to the optical recording medium 2, the tilt of the objective lens 7 with respect to the optical recording medium 2 is adjusted by the lens tilt adjusting mechanism 12, the optical axis J2 of the exit light from the objective lens 7 is constantly maintained perpendicular to the optical recording medium 2, and thus satisfactory reproduction performance and recording performance can be achieved. In FIG. 5, the applied voltage to the piezoelectric element 15 on the right side is raised from the initial state to extend the relevant piezoelectric element 15, the applied voltage to the piezoelectric element 15 on the left side is lowered to contract the relevant piezoelectric element 15, and the applied voltage to the piezoelectric element 15 at the middle is maintained at the initial value so as not to extend nor contract the relevant piezoelectric element 15, whereby the lens holder 14 is tilted with the contacting point of the middle piezoelectric element 15 and the lens holder 14 as the supporting point and the main point 7j of the objective lens 7 as the center of rotation, the tilt of the objective lens 7 with respect to the optical recording medium 2 is adjusted, and the optical axis J2 of the exit light from the objective lens 7 is held perpendicular to the optical recording medium 2.

Since no other member is interposed between the objective lens 7 and the optical recording medium 2, the working distance WD (FIG. 4) between the objective lens 7 and the optical recording medium 2 can be freely set short without being subjected to limitation. Thus, it is possible to respond advantageously to high density recording and reproduction that has been increasingly demanded in recent years and will be in the future.

Since the lens tilt adjusting mechanism 12 is configured by the piezoelectric elements 15, the lens holder 14, and the holder fit-in part 13 arranged at the movable part 22 of the actuator 11, the number of components is few, the configuration is simple, and the manufacturing cost can be suppressed low. Furthermore, the tilt adjustment in multi-directions of the objective lens 7 is realized by using three piezoelectric elements 15, and the cost for the piezoelectric element 15 can be suppressed low.

Figure 7:
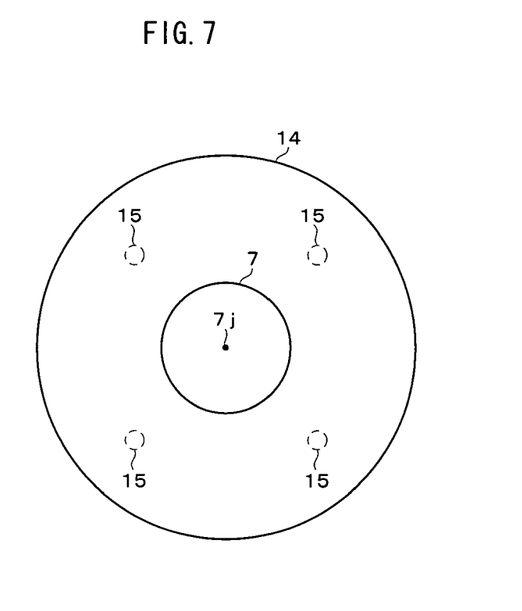
FIG. 7 is an arrangement view of the piezoelectric element according to another embodiment.
Figure 8:
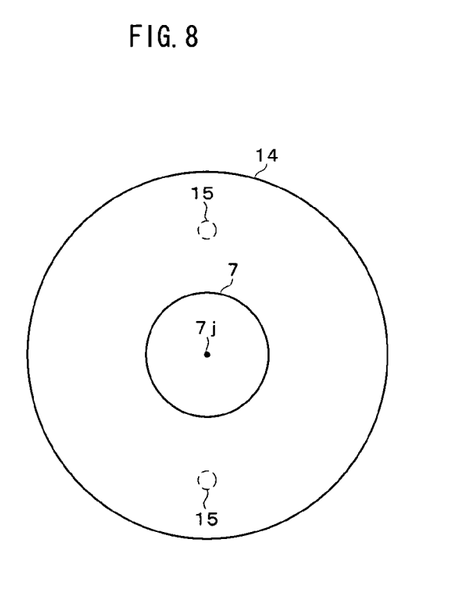
FIG. 8 is an arrangement view of the piezoelectric element according to another embodiment.
Figure 9:
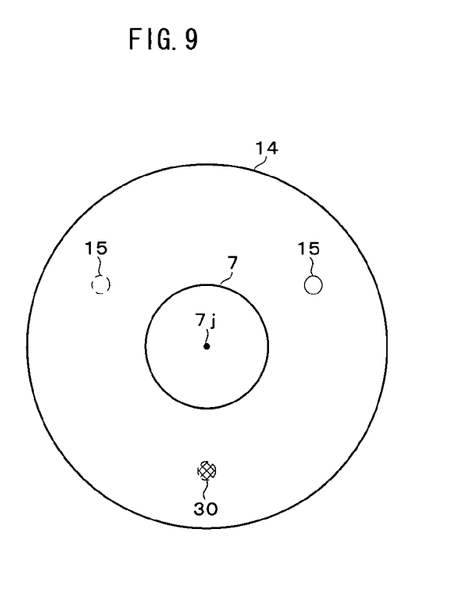
FIG. 9 is an arrangement view of the piezoelectric element according to another embodiment.
Figure 10:
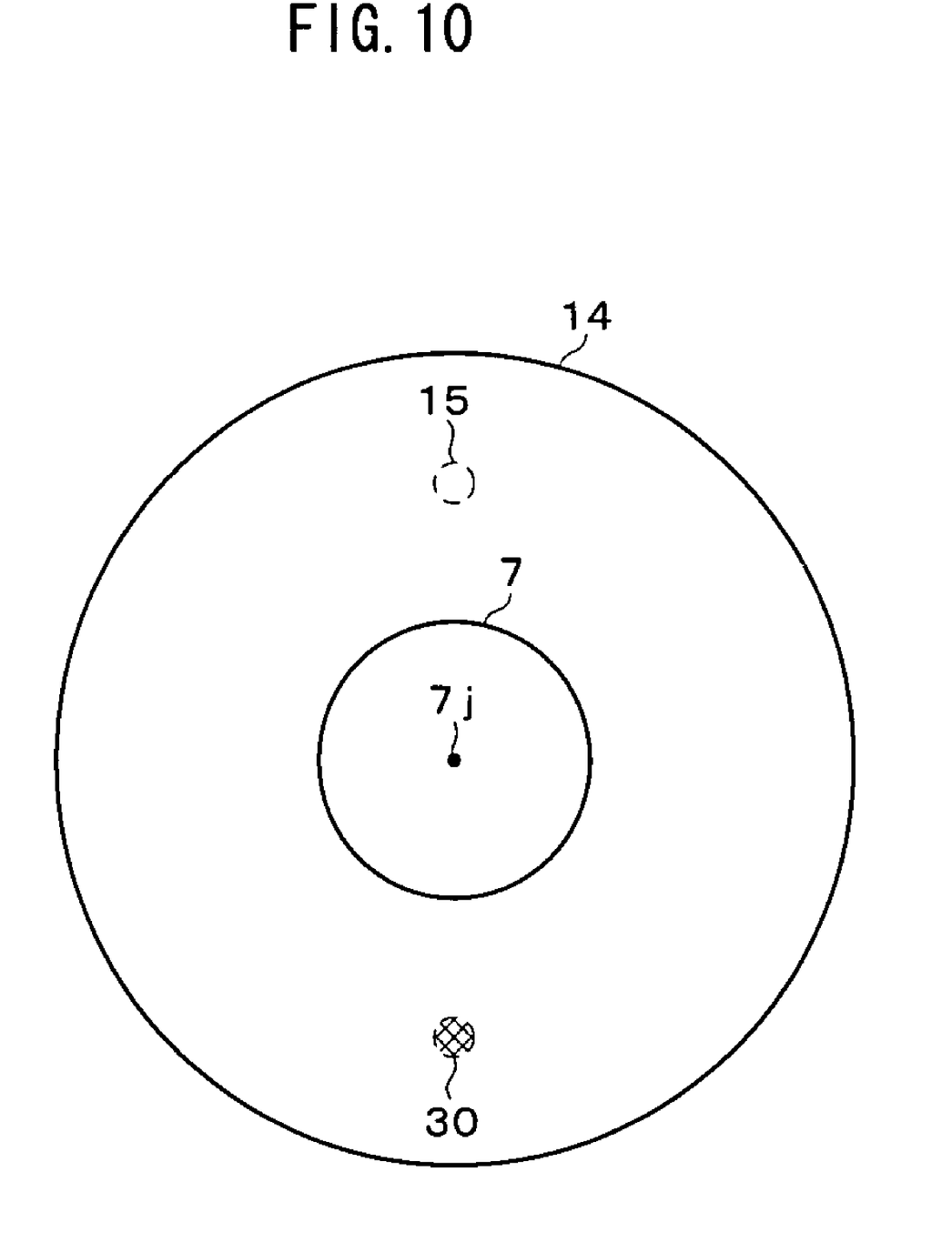
FIG. 10 is an arrangement view of the piezoelectric element according to another embodiment.

The present invention may employ various modes other than the above embodiment. For instance, an example of using three piezoelectric elements 15 as a driving source for tilting the objecting lens 7 with the entire lens holder 14 has been described in the above embodiment, but the present invention is not limited thereto. The number of piezoelectric elements 15 may be greater than or equal to four, or less than or equal to two. If four or more piezoelectric elements 15 are used, the piezoelectric elements 15 are arranged at equiangular interval at the periphery of the objective lens 7 as shown, for example, in FIG. 7. In this manner, the tilt of objective lens 7 can be adjusted in multi-directions at good balance with the entire lens holder 14 by the extending and contracting operation of each piezoelectric element 15. If two piezoelectric elements 15 are used, the piezoelectric element 15 may be arranged at two line symmetric points at the periphery of the objective lens 7 as shown, for example, in FIG. 8, or the piezoelectric elements 15 may be arranged at two out of three points of equiangular interval at the periphery of the objective lens 7 and the supporting part 30 for supporting the lens holder 14 from the side away from the optical recording medium 2 may be arranged at the remaining one point integrally or as a separate body with the step surface 13a as shown, for example, in FIG. 9. Furthermore, if one piezoelectric element 15 is used, the piezoelectric elements 15 may be arranged at one out of two line symmetric points at the periphery of the objective lens 7 and the supporting part 30 for supporting the lens holder 14 from the side away from the optical recording medium 2 side may be arranged at the other one point as shown, for example, in FIG. 10. In this manner, the tilt of objective lens 7 can be adjusted at good balance with the entire lens holder 14 by the extending and contracting operation of each piezoelectric element 15. The piezoelectric element 15 shown in FIGS. 7 to 10 contacts the step surface 13b of the holder fit-in part 13 and the lens holder 14, and is attached to the inner side of the holder fit-in part 13, as shown in FIG. 4 etc.

In the above embodiments, an example of applying the present invention to the optical pickup device 1 of axis rotation slidably moving type or wire suspension type has been described, but the present invention is also applicable to an optical pickup device other than the above.

What is claimed is:

1. An optical pickup device comprising an actuator including a movable part mounted with an objective lens, a fixed part for movably supporting the movable part, and a coil and a magnet for moving the objective lens with the entire movable part in a tracking direction and a focusing direction; a lens tilt adjusting mechanism for adjusting a tilt of the objective lens by an extending and contracting operation of a piezoelectric element; a light detector for receiving a reflected light from an optical recording medium when an emitted light from a light source is collected on the optical recording medium by the objective lens and detecting electrical signals; and a control unit for controlling drive of the piezoelectric element based on the detection result of the light detector; wherein the lens tilt adjusting mechanism is configured by the piezoelectric element, a lens holder formed into a ring shape, and a holder fit-in part arranged in a cylindrical form in the movable part of the actuator;

the objective lens is fixed on an inner side of the lens holder such that a main point of the objective lens coincides with a center axis of the lens holder;

an outer peripheral surface of the lens holder is formed into a curved surface in an axial direction;

an inner peripheral surface of the holder fit-in part is formed into a curved surface in the axial direction so as to adapt with a trajectory of the outer peripheral surface of the lens holder when the lens holder rotates with the main point of the objective lens as the center on the inner side of the holder fit-in part, a projection being arranged at an end on the optical recording medium side of the inner peripheral surface;

the lens holder is fitted to the inner side of the holder fit-in part, and held in the holder fit-in part so that the center axis of the lens holder coincides with the center axis of the holder-fit in part and an optical axis of the light passing through the holder fit-in part, and the lens holder can tilt when the outer peripheral surface of the lens holder contacts and slides along the inner peripheral surface of the holder fit-in part;

three piezoelectric elements are attached at an equiangular interval on the inner side of the holder fit-in part so that one end in an extending and contracting direction of the piezoelectric element contacts a step surface formed on a side away from the optical recording medium of the lens holder on the inner side of the holder fit-in part and the other end contacts the surface on the side away from the optical recording medium of the lens holder, and are extended to a predetermined length longer than in shortest state and shorter than in longest state by applying offset voltage in an initial state; and other members are not interposed between the objective lens and the optical recording medium.

2. An optical pickup device comprising an actuator including a movable part mounted with an objective lens, a fixed part for movably supporting the movable part, and a moving means for moving the objective lens with the entire movable part in a tracking direction and a focusing direction; a lens tilt adjusting mechanism for adjusting a tilt of the objective lens by an extending and contracting operation of a piezoelectric element; a light detector for receiving a reflected light from an optical recording medium when an emitted light from a light source is collected on the optical recording medium by the objective lens and detecting electrical signals; and a control unit for controlling drive of the piezoelectric element based on the detection result of the light detector; wherein the lens tilt adjusting mechanism is configured by the piezoelectric element, a lens holder, and a holder fit-in part arranged in a tubular form in the movable part of the actuator;

the objective lens is fixed to the lens holder;

the lens holder is fitted to the inner side of the holder fit-in part, and held in the holder fit-in part in a tiltable manner when an outer peripheral surface of the lens holder contacts and slides along an inner peripheral surface of the holder fit-in part;

the piezoelectric element is attached on the inner side of the holder fit-in part so that one end in an extending and contracting direction of the piezoelectric element contacts a step surface formed on a side away from the optical recording medium of the lens holder on the inner side of the holder fit-in part and the other end contacts the surface on the side away from the optical recording medium of the lens holder; and other members are not interposed between the objective lens and the optical recording medium.

3. The optical pickup device according to claim 2, wherein a plurality of piezoelectric elements is arranged at equiangular interval on the inner side of the holder fit-in part.

4. The optical pickup device according to claim 2, wherein the piezoelectric element is extended to a predetermined length longer than in shortest state and shorter than in longest state by applying offset voltage in an initial state.

5. The optical pickup device according to claims 2, wherein the lens holder is formed into a ring shape;

the objective lens is fixed on an inner side of the lens holder such that a main point of the objective lens coincides with a center axis of the lens holder;

the lens holder is held in the holder fit-in part so that the center axis of the lens holder coincides with the center axis of the holder-fit in part and an optical axis of the light passing through the holder fit-in part;

the holder fit-in part is formed into a cylindrical form; and an inner peripheral surface of the holder fit-in part is formed into a curved surface in the axial direction so as to adapt with a trajectory of the outer peripheral surface of the lens holder when the lens holder rotates with the main point of the objective lens as the center on the inner side of the holder fit-in part.

6. The optical pickup device according to claims 2, wherein a projection is arranged at an end on the optical recording medium side of the inner peripheral surface of the holder fit-in part.

* * * * *